(12) United States Patent
Yamada et al.

(10) Patent No.: US 8,740,471 B2
(45) Date of Patent: Jun. 3, 2014

(54) RETAINER SEGMENT FOR TAPERED ROLLER BEARING, TAPERED ROLLER BEARING, AND METHOD FOR MOUNTING TAPERED ROLLER BEARING

(75) Inventors: Masahiro Yamada, Kuwana (JP); Katsunori Sone, Kuwana (JP); Tsukasa Toyoda, Kuwana (JP); Yoriko Kosaka, Kuwana (JP); Yuuki Ishizaki, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/518,527

(22) PCT Filed: Oct. 27, 2010

(86) PCT No.: PCT/JP2010/069046
§ 371 (c)(1),
(2), (4) Date: Jun. 22, 2012

(87) PCT Pub. No.: WO2011/077831
PCT Pub. Date: Jun. 30, 2011

(65) Prior Publication Data
US 2012/0263408 A1    Oct. 18, 2012

(30) Foreign Application Priority Data

Dec. 25, 2009 (JP) .................................. 2009-293842
Aug. 11, 2010 (JP) .................................. 2010-180444

(51) Int. Cl.
*F16C 33/51* (2006.01)
(52) U.S. Cl.
USPC ........................... 384/573; 384/560; 384/580
(58) Field of Classification Search
USPC .................. 384/559, 560, 561, 572, 573, 580
See application file for complete search history.

(56) References Cited

U.S. PATENT DOCUMENTS 1,104,363 A * 7/1914 Lockwood .................... 384/569
4,699,529 A  10/1987 Scholl et al.
(Continued)

FOREIGN PATENT DOCUMENTS

CN    2720193     8/2005
CN    101331334   12/2008
(Continued)

OTHER PUBLICATIONS

International Preliminary Report on Patentability issued Aug. 23, 2012 in International (PCT) Application No. PCT/JP2010/069046.

(Continued)

*Primary Examiner* — Thomas R Hannon
(74) *Attorney, Agent, or Firm* — Wenderoth, Lind & Ponack, L.L.P.

(57) ABSTRACT

An object of the present invention is to prevent breakup of segments which constitute a split type retainer for a tapered roller bearing, when the tapered roller bearing is being mounted on target equipment, thereby improving operability in the mounting process. A segment for a tapered roller bearing is provided with a predetermined number of posts between a small-diameter-side end fringe which constitutes a small-diameter-side circumferential edge of a split type retainer and a large-diameter-side end fringe which constitutes a large-diameter-side circumferential edge thereof. Pockets are formed between the posts. At least the large-diameter-side end fringe, out of the small-diameter-side end fringe and the large-diameter-side end fringe, is provided with a large-diameter-side engagement piece. When the bearing is mounted, the large-diameter-side engagement piece is engaged with the large-diameter engagement member fitted and fixed onto the bearing's inner ring, whereby the segment is prevented from breaking up.

14 Claims, 9 Drawing Sheets

(56) References Cited

U.S. PATENT DOCUMENTS

| | | | |
|---|---|---|---|
| 5,009,525 A * | 4/1991 | Brockmuller et al. | 384/576 |
| 2010/0002973 A1 | 1/2010 | Omoto | |
| 2010/0322548 A1 | 12/2010 | Kanbori et al. | |

FOREIGN PATENT DOCUMENTS

| | | |
|---|---|---|
| EP | 1 961 983 A1 | 8/2008 |
| JP | 58-165324 | 11/1983 |
| JP | 61-20920 | 2/1986 |
| JP | 62-49015 | 3/1987 |
| JP | 7-25332 | 5/1995 |
| JP | 11-325083 | 11/1999 |
| JP | 2002-54638 | 2/2002 |
| JP | 2002-227849 | 8/2002 |
| JP | 2005-98412 | 4/2005 |
| JP | 2006-207730 | 8/2006 |
| JP | 2007-162912 | 6/2007 |
| JP | 2007-244154 | 9/2007 |
| JP | 2007-255563 | 10/2007 |
| JP | 2008-82380 | 4/2008 |
| JP | 2009-14044 | 1/2009 |
| JP | 2009-121513 | 6/2009 |
| JP | 2009-209952 | 9/2009 |

OTHER PUBLICATIONS

International Search Report issued Jan. 25, 2011 in corresponding International Application No. PCT/JP2010/069046.

Office Action issued Feb. 18, 2014 in corresponding Japanese Application No. 2010-180444, with English translation.

Office Action issued Mar. 19, 2014 in corresponding Chinese Application No. 201080057248.1, with partial English translation.

* cited by examiner

RETAINER SEGMENT FOR TAPERED ROLLER BEARING, TAPERED ROLLER BEARING, AND METHOD FOR MOUNTING TAPERED ROLLER BEARING

TECHNICAL FIELD

The present invention relates to a retainer segment (hereinafter simply called "segment") to constitute a split-type retainer for a tapered roller bearing; to a tapered roller bearing which makes use of the segments; and to a method for mounting the tapered roller bearing to target equipment successfully without allowing the segments to split and fall off, i.e., without allowing the segments to "break up".

BACKGROUND ART

In tapered roller bearings, it is common to use split type retainers as retainers for tapered rollers for a purpose of improved assemblability (Patent Literature 1). In this case, a split type retainer is made of segments, each being a generally quadrangle frame given by equally dividing a cone-frustum-shaped cage-type retainer along planes of division each passing through a centerline of the retainer. The retainer has a smaller-diameter-side frame portion and a larger-diameter-side frame portion opposed thereto, with a plurality of posts connecting these two frame portions, and a plurality of pockets formed between the posts for retaining tapered rollers.

When the tapered roller bearing is mounted to target equipment, first, the bearing's inner ring is fitted and fixed around a shaft, and thereafter the segments loaded with tapered rollers are placed around the inner ring track. Then, an outer ring is fitted around the tapered rollers, and finally a housing of the equipment is fitted around the outer ring outer diameter surface to complete the mounting.

CITATION LIST

Patent Literature

Patent Literature 1: JP-A-2007-162912 (FIG. 2 and FIG. 14)

SUMMARY OF INVENTION

Technical Problem

When mounting a tapered roller bearing which makes use of a split type retainer to target equipment, the assembling procedure includes a step, as described above, where a predetermined number of segments are placed around the inner ring track. Since the outer ring is not yet fitted when this step is performed, the segments placed around the inner ring track and the tapered rollers supported thereby are under an unstable condition. This can lead to breakup of the segments and the tapered rollers during the assembly operation, leading to poor operability in the assembling process.

Therefore, an object of the present invention is to provide a segment which has anti-breakup means that works in the process of mounting a tapered roller bearing; to provide a tapered roller bearing including a split type retainer constituted by the segments; and to provide a method for mounting a tapered roller bearing which will not allow the retainer to break up during the mounting.

When a tapered roller bearing which includes a split type retainer as described above is mounted on a lateral (horizontal) shaft, the retainer is guided by the tapered rollers, i.e., the bearing is a roller riding type. This configuration, however, can lead to a problem that when the segment passes the bottom dead point of bearing rotation (a bottom dead point as recognized when rotation of the bearing is interpreted as a vertical reciprocating action; hereinafter this definition will apply), the segment will come off the tapered rollers, moves downward (toward the outer ring track), resulting in interference with the outer ring members. Therefore, it is another object of the present invention to prevent such interference, thereby providing a roller riding type bearing in which the retainer can rotate on the rollers stably over its entire track.

Solution to Problem

In order to achieve the object, the present invention provides a segment for a tapered roller bearing. The segment has a shape given by equally dividing a conical, cage-shaped retainer by planes of division each passing through a centerline of the retainer. Connecting a plurality of these segments in an annular pattern provides a split type retainer, each of the segments having a small-diameter-side end fringe constituting a small-diameter-side circumferential edge of the split type retainer and a large-diameter-side end fringe constituting a large-diameter-side circumferential edge of the retainer. A predetermined number of posts are provided between the small-diameter-side end fringe and the large-diameter-side end fringe while roller holding pockets are provided between the posts. With the above-described arrangement, at least the large-diameter-side end fringe, out of the small-diameter-side end fringe and the large-diameter-side end fringe, is provided with an axially outward protruding large-diameter-side engagement piece.

The object of preventing the segment from coming off the tapered rollers at the bottom dead point of rotation is achieved by a segment having the following arrangement: Specifically, out of all the posts which provide the pockets, each of the post at the left end and the post at the right end has its inner side surface provided with an anti-dislocation projection protruding inward of the pocket. The anti-dislocation projection protrudes to an extent to allow forcible fitting (hammering-in) of the tapered roller into the pocket, but not to allow the tapered roller to come off after the forcible fitting.

A tapered roller bearing according to the present invention has the following arrangement: A large-diameter mounting portion provided on an axially outer side of a large flange of the bearing's inner ring is fitted with a large-diameter engagement member, and the large-diameter engagement member has a section resembling an inverted letter L, providing an inward facing engagement recess.

Further, a method for mounting the tapered roller bearing according to the present invention includes steps of: fitting and fixing the bearing's inner ring around a shaft; then fitting and fixing the large-diameter engagement member to the large-diameter mounting portion of the inner ring; then placing the retainer segments loaded with tapered rollers around an inner ring track while engaging the segments' large-diameter-side engagement pieces with the large-diameter mounting member; and after completing this placement, fitting the bearing's outer ring around the tapered rollers.

Advantageous Effects of Invention

According to the segment, the tapered roller bearing which makes use of the segment, and the method for mounting the tapered roller bearing, the following advantages are offered: When mounting the tapered roller bearing onto target equipment, the large-diameter-side engagement pieces of the segments are engaged with the large-diameter engagement member during the step of placing a predetermined number of segments loaded with the tapered rollers around the inner ring track. This prevents breakup of the segments from the large-diameter side.

Also, after all of the segments are placed, the small-diameter engagement member is fitted and fixed to the small-diameter mounting portion thereby engaging the small-diameter engagement member with the small-diameter-side engagement pieces. This prevents breakup of the segments from the small-diameter side, too.

Since breakup of the segments at the time of mounting the tapered roller bearing is prevented as described above, it is possible to improve operability in the mounting operation.

Also, the segment in which the left and the right end posts have their inner surfaces provided with the anti-dislocation projections does not come off the tapered rollers even when the segment is passing the bottom dead point of bearing rotation. Therefore, the present invention can provide stable roller-riding-type guide to the split type retainer which is constituted by the segments.

DESCRIPTION OF EMBODIMENTS

Figure 1:
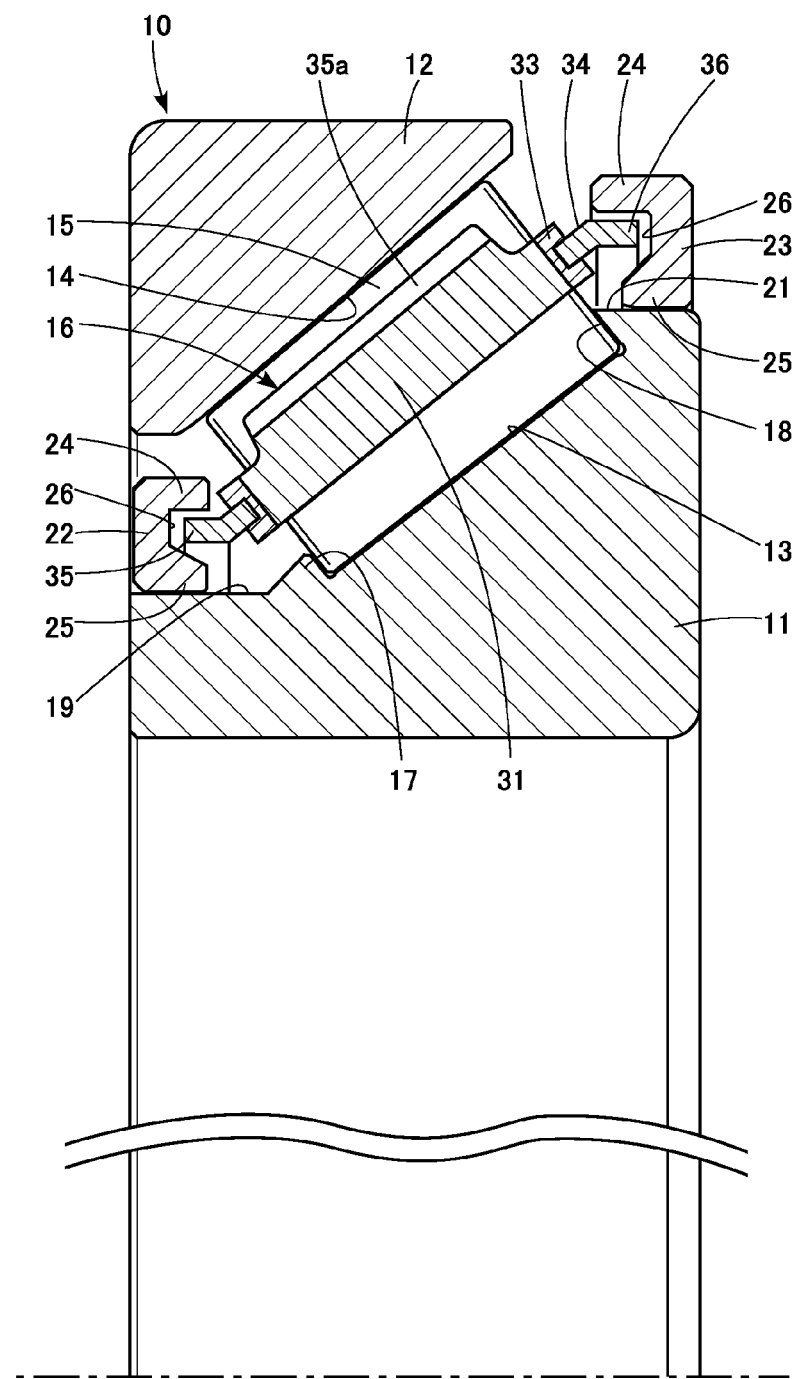
FIG. 1 is a partially omitted sectional view of a tapered roller bearing according to Embodiment 1.

Hereinafter, embodiments of the present invention will be described with reference to the attached drawings.

Embodiment 1

As shown in FIG. 1 through FIG. 5, a tapered roller bearing 10 according to Embodiment 1 includes an inner ring 11; an outer ring 12 placed coaxially on the inner ring's outer circumference; tapered rollers 15 placed between an inner ring track 13 of the inner ring 11 and an outer ring track 14 of the outer ring 12; and a split type retainer 16 which holds the tapered rollers 15 equidistantly.

The inner ring track 13 is formed with a small flange portion 17 on its small-diameter side, and a large flange portion 18 on its large-diameter side. These two flange portions 17, 18 guide the tapered rollers 15 for rotation. On axially outer sides of the small flange portion 17 and the large flange portion 18, a small-diameter mounting portion 19 and a large-diameter mounting portion 21 are formed respectively.

The small-diameter mounting portion 19 and the large-diameter mounting portion 21 have their respective outer diameter surfaces, to which a ring-shaped small-diameter engagement member 22 and a large-diameter engagement member 23 are pressed from the axial direction to fix the assembly. These engagement members 22, 23 each have a section which resembles an inverted letter L, having a radial protrusion 24. On an inner-diameter side of the protrusion 24, an inward-protruding reinforcing base 25 is provided to face the protrusion, whereby there is formed an engagement recess 26 between the protrusion 24 and the base 25. Each of the engagement members 22, 23 has its base 25 pressed and fitted into an outer diameter surface of the small-diameter mounting portion 19 or of the large-diameter mounting portion 21, with its engagement recess 26 faced inward.

Figure 2:
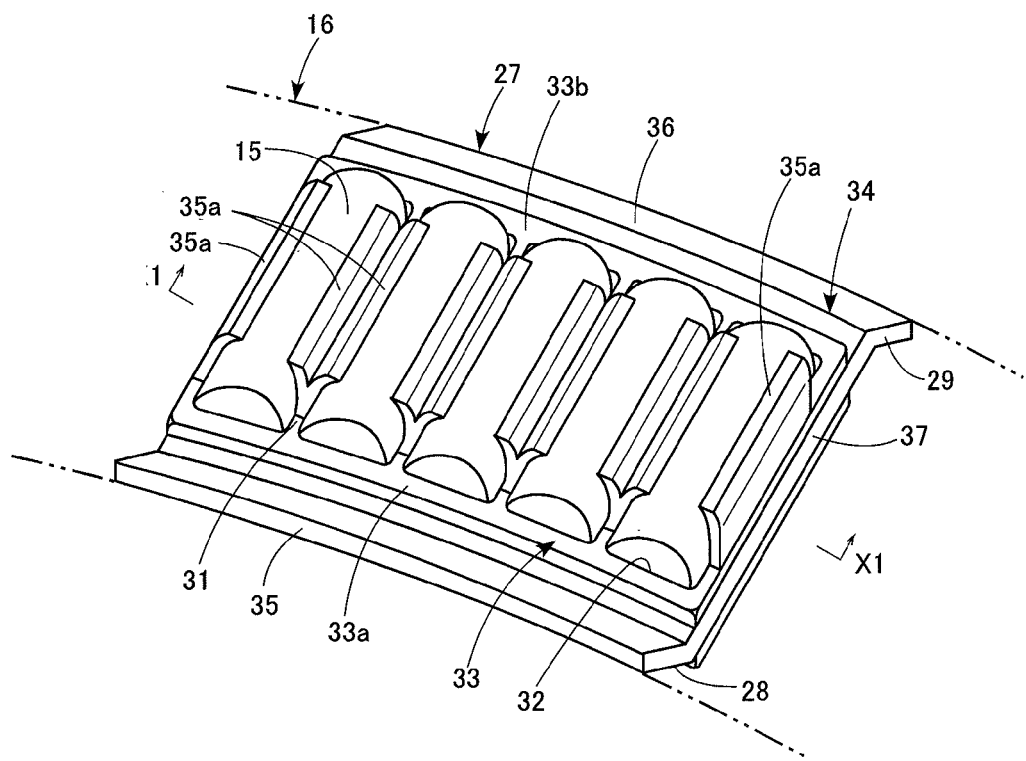
FIG. 2 is a perspective view of a retainer segment with tapered rollers held thereby in Embodiment 1.
Figure 3:
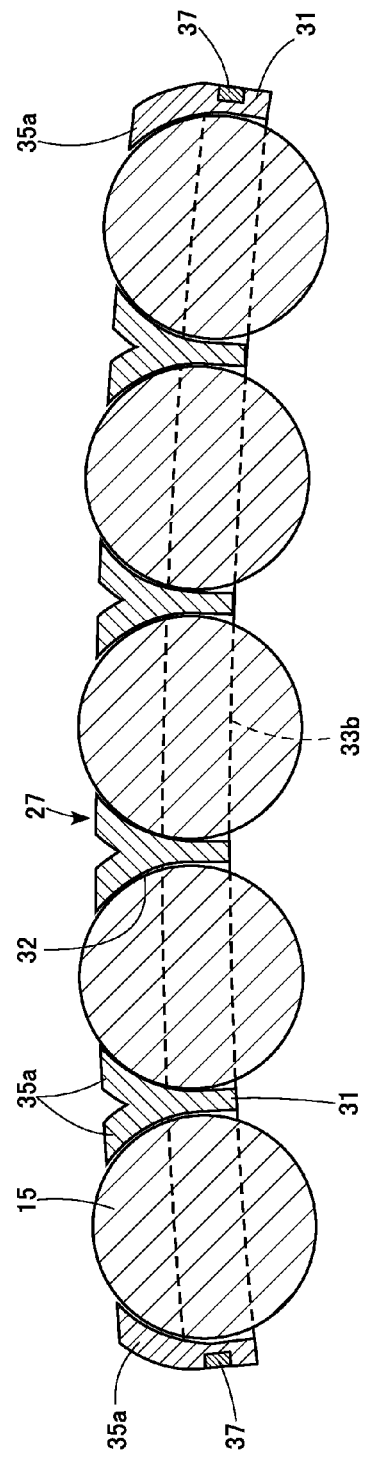
FIG. 3 is an enlarged sectional view taken in lines X1-X1 in FIG. 2.

As shown in FIG. 2, the segment 27 as a constituent element of the split type retainer 16 is like a frame as obtained by dividing a cone-frustum-shaped cage-type retainer equally along planes of division each including a centerline of the retainer. By assembling these segments 27 into an annular pattern, the split type retainer 16 is completed, which has a small-diameter-side end fringe 28 on one axial end and a large-diameter-side end fringe 29 on the other axial end.

The segment 27 includes a segment main body 33 made of a resin, and an outer frame member 34 made of a metal which surrounds the segment main body 33 integrally therewith.

The segment main body 33 is a rectangular frame having a plurality (a total of six according to the embodiment shown in the drawings) of posts 31 provided between a pair of mutually opposed longer sides of the rectangle. The posts 31 are made at an interval, providing a plurality (a total of five according to the drawings) of pockets 32. Each pocket 32 holds and supports one of the tapered rollers 15. Hereafter, a side of the segment main body 33 faced by small-diameter ends of the tapered rollers 15 will be called small-diameter-side wall 33a whereas a side faced by large-diameter ends thereof will be called large-diameter-side wall 33b.

Each post 31 has an upper side formed with Y-shaped engagement claws 35a having two arc-shaped claws (see FIG. 3) extending above two respective pockets 32 located on both sides. Each engagement claw 35a holds on and prevents the tapered roller 15 placed in the pocket 32 below from coming out on the outer ring 12 side. The post 31 at each end of the segment main body 33 is formed with only one, inwardly extending arc-shaped engagement claw 35a to hold on and prevent one tapered roller 15 on the inner side from coming out on the outer ring 12 side.

As shown in FIG. 2, the outer frame member 34 is a rectangular frame defined by a small-diameter-side engagement piece 35 which is opposed to the small-diameter-side wall 33a of the segment main body 33; a large-diameter-side engagement piece 36 which is opposed to the large-diameter-side wall 33b; and a left and a right shorter side walls 37 corresponding to the left-end and the right-end posts 31 in the segment main body 33. An insert molding technique is employed to integrally fit the segment main body 33 to an inner side of the outer frame member 34.

The small-diameter-side engagement piece 35 and the large-diameter-side engagement piece 36 each extend axially of the segment 27, and their tip portions are bent to be parallel with the axis (see FIG. 1). Each of these bent tip portions is inserted into a corresponding one of the engagement recesses in the small-diameter engagement member 22 and the large-diameter engagement member 23. A radial gap is provided between each of the engagement pieces 35, 36 and the corresponding engagement recess 26, in order to prevent interference of the segment 27 with the engagement members 22, 23.

As will be described later, the small-diameter engagement member 22 and the large-diameter engagement member 23 are primarily for preventing breakup of the segment 27 when the tapered roller bearing 10 is mounted onto target equipment, so they may be removed after the mounting is completed.

It should be noted here that the segment 27, or the segment main body 33 and the outer frame member 34, may be formed entirely of a synthetic resin by means of an injection molding technique.

Figure 4:
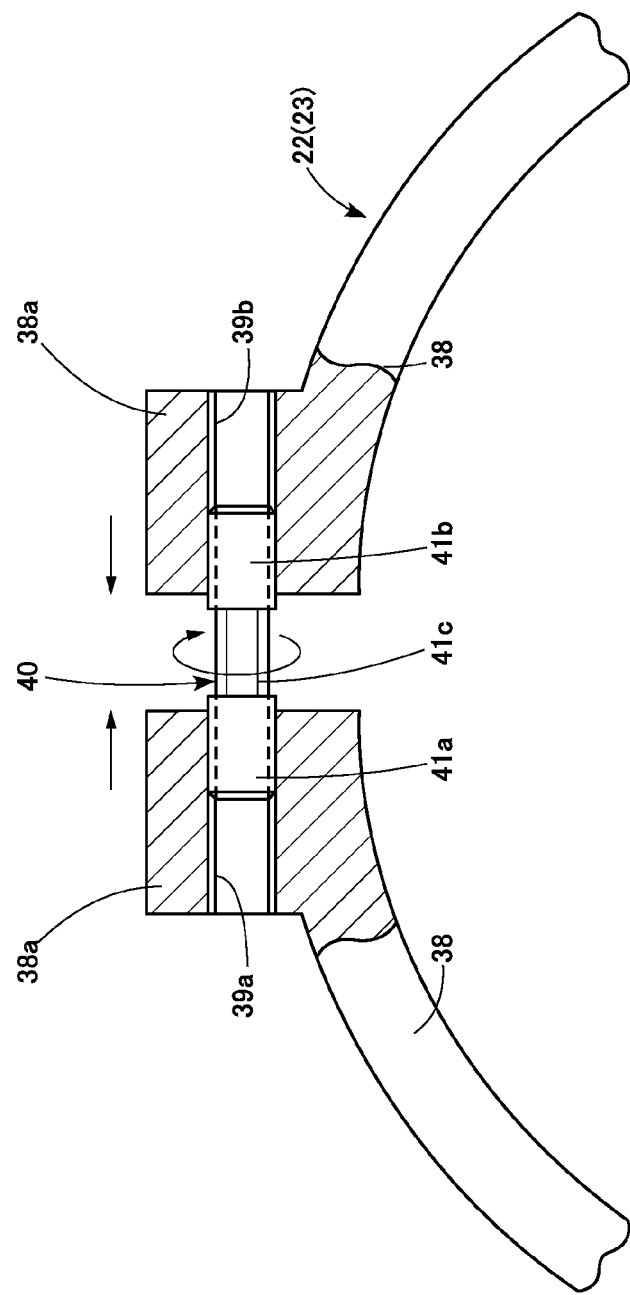
FIG. 4 is a partially omitted enlarged sectional view of a mounting member as a variation of a mounting member in Embodiment 1.
Figure 5:
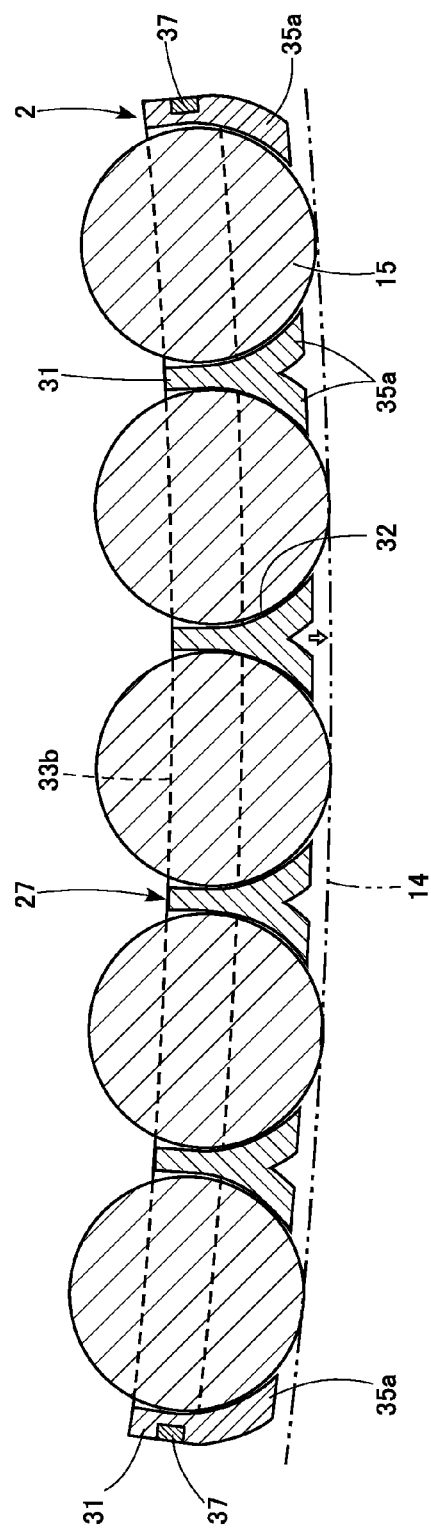
FIG. 5 is a sectional view of a segment, with tapered rollers held thereby.

FIG. 4 shows a different example of the small-diameter engagement member 22 and of the large-diameter engagement member 23, each being like a halved ring. Specifically, in this case, a semi-circular, engagement-member half 38 has its two end portions each provided with a connection flange 38a extending in the direction of the outer diameter. One of the pairing connection flanges 38a has its mating surface formed with a right-threaded hole 39a while the other has its mating surface formed with a coaxial left-threaded hole 39b.

The two engagement-member halves 38 are connected into a ring shaped assembly using connecting members 40, each which has its one end formed with a right-threaded shaft 41a and another end formed with a left-threaded shaft 41b, with an intermediate shaft portion 41c formed as a polygonal shaft.

The threaded shafts 41a, 41b of the connecting members 40 are inserted into their corresponding threaded holes 39a, 39b, and then the intermediate shaft portion 41c is rotated in a predetermined direction using a wrench, to bring both of the connection flanges 38a closer to each other as indicated by arrows, to be connected to form a ring-shaped assembly of the small-diameter engagement member 22 or the large-diameter engagement member 23. These members are then placed and tightened around the small-diameter mounting portion 19 and the large-diameter mounting portion 21 of the inner ring 11. After the bearing has been mounted, the small-diameter engagement member 22 and the large-diameter engagement member 23 may be removed obviously, as mentioned earlier.

Description thus far has covered the tapered roller bearing 10 according to Embodiment 1. When mounting this bearing onto target equipment, first in advance, the large-diameter engagement member 23 is fitted and fixed around the large-diameter mounting portion 21 of the inner ring 11. With this preparation, the equipment is placed so that the bearing axis is upright and the large-diameter engagement member 23 comes on the lower side. Then, a predetermined number of the segments 27 each loaded with the tapered rollers 15 are placed in an annular pattern around the inner ring track 13. During this step, the large-diameter-side engagement piece 36 of each segment 27 is engaged with the engagement recess 26 of the large-diameter engagement member 23. This prevents breakup of the segment 27 and the tapered rollers 15 on the large-diameter side.

After all of the segments 27 have been placed, the small-diameter engagement member 22 is fitted and fixed to the small-diameter mounting portion 19 while the small-diameter-side engagement piece 35 is engaged with the engagement recess 26. This prevents breakup on the small-diameter side. Thereafter, a conventional mounting procedure will follow, i.e., the outer ring 12 is fitted around the tapered rollers 15; and then by fitting the housing around the outer ring 12, mounting of the tapered roller bearing 10 is complete.

As has been described, the small-diameter engagement member 22 and the large-diameter engagement member 23 no longer play a specific part after the mounting is over, so these members may be disassembled and removed from the tapered roller bearing 10 once the mounting is complete.

It should be noted here that the engagement claws 35a prevent the tapered rollers 15 from coming out of the pockets 32 (toward the outer ring 12).

In Embodiment 1 which has been described so far, the small-diameter-side engagement piece 35 is provided in the small-diameter end fringe 28 of the segment 27, and correspondingly to this, the small-diameter engagement member 22 is fitted and fixed into the small-diameter mounting portion 19 of the bearing's inner ring 11. When the bearing is being mounted, the segments 27 tilt inward along the cone-shaped inner ring track 13 while the large-diameter-side engagement piece 36 is in engagement with the large-diameter engagement member 23 and therefore, the bearing assumes a stable state. For this reason, it is not absolutely necessary to immobilize the small-diameter end fringe 28 side of the segment 27.

Thus, at the time of mounting, the step of fitting and fixing the small-diameter engagement member 22 to the small-diameter mounting portion 19 and the step of engaging the small-diameter-side engagement piece 35 with the engagement recess 26 may be omitted, and the step of fitting the outer ring 12 around the tapered rollers 15 is performed as soon as the segments 27 are placed.

Description will be made for a segment 27 and a tapered roller bearing 10 according to Embodiment 2, based on FIG. 6 through FIG. 8B.

The tapered roller bearing 10 according to Embodiment 1 described thus far offers an advantage that the segments 27 loaded with tapered rollers will not break up when these segments 27 are being assembled around the inner ring track. However, once the bearing is mounted and being used, the following problem will occur:

Specifically, as the tapered roller bearing 10 rotates, the split type retainer 16, which is composed of a plurality of the segments 27 assembled in an annular pattern, will provide a roller riding type guide as mentioned earlier. However, if the tapered roller bearing 10 supports a lateral (horizontal) rotating shaft, there is a phenomenon that the segment 27 will come off the tapered rollers 15 as indicated by a white arrow in FIG. 5, and move (downward) toward the outer ring track surface 14 when the segment 27 passes the bottom dead point of its rotation.

Such a phenomenon leads to loss of roller guiding function in the segment 27, causing a problem that the small-diameter-side engagement piece 35 or the large-diameter-side engagement piece 36 of the segment 27 (see FIG. 1) will interfere with an inner diameter surface of the protrusion 24 in the small-diameter-side engagement members 22 or in the large-diameter-side engagement members 23.

Therefore, Embodiment 2 provides a tapered roller bearing which includes segments 27 that achieve stable roller-riding-type guide over the entire track of rotation, thereby eliminating the interference with other components as described above.

Figure 6:
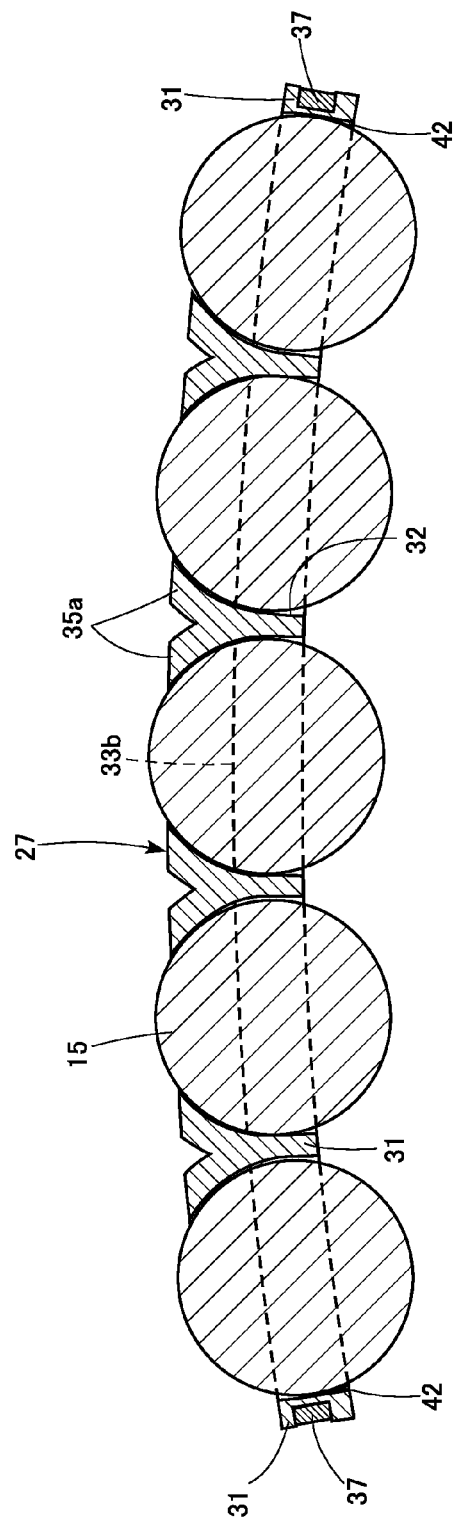
FIG. 6 is a sectional view of a segment according to Embodiment 2, with tapered rollers held thereby.

As shown in FIG. 6, Embodiment 2 makes use of a segment 27 which has essentially the same configuration as the one used in Embodiment 1. Differences include that in each of the posts 31 on the left end and on the right end, an anti-dislocation projection 42 (see FIG. 6, FIG. 7A, FIG. 7B and FIG. 7C) is provided at a side edge on the inner diameter surface side of the inner side surface of the post 31, which constitutes the pocket 32. The anti-dislocation projection 42 is off a center O of the pocket 32, at a location closer to the small-diameterside engagement piece 35, and has a triangular section, sharing the same surface as the inner-diameter-side surface of the post 31.

The anti-dislocation projection 42 has a maximum inward protruding dimension into the pocket 32, which allows hammering-in, i.e., placing the tapered roller 15 by applying a strong impact thereby elastically deforming the anti-dislocation projection 42. Such a dimensional setting allows forcible fitting of the tapered roller 15 into the pocket 32 without the need for special tools or without the risk of destroying the segment 27.

Also, there is a minimum protruding dimension specified to a value which prevents the tapered roller 15 from coming out of the pocket 32 due to centrifugal force and the weight of the segment 27 during bearing rotation. Normally, the protruding dimension is set to 2 percent through 8 percent of an average diameter of the tapered rollers 15.

Figure 7A:
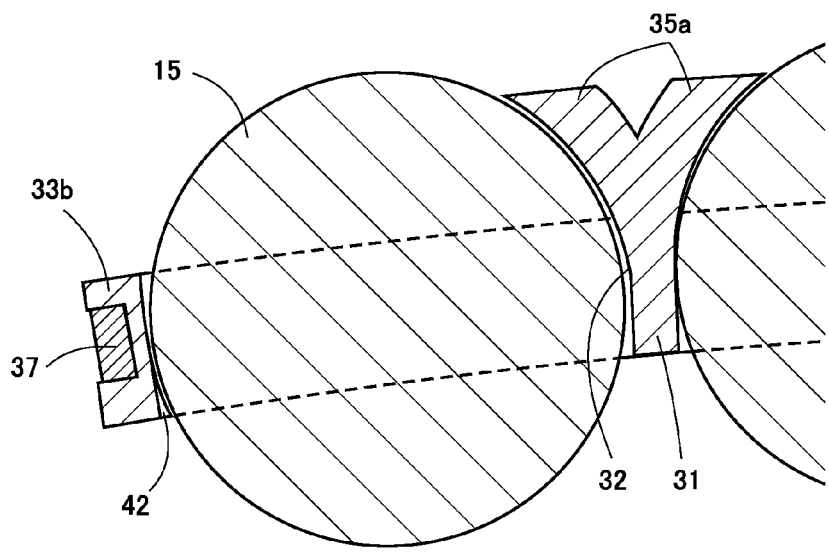
FIG. 7A is an enlarged sectional view of a portion in FIG. 6.
Figure 7B:
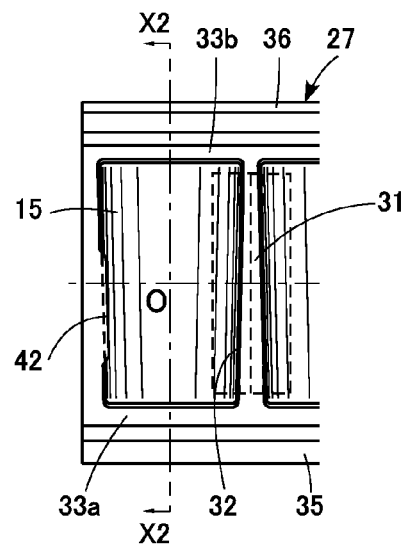
FIG. 7B is a bottom view of the portion shown in FIG. 7A.
Figure 7C:
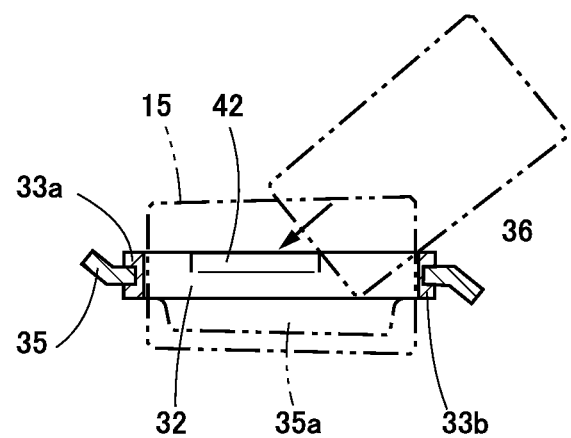
FIG. 7C is a sectional view taken in lines X2-X2 and is rotated by 90 degrees.

Since the anti-dislocation projection 42 is off center and being closer to the small-diameter-side engagement piece 35, the pocket 32 is relatively more open on its side closer to the large-diameter-side engagement piece 36 (see FIG. 7C). When the tapered roller 15 is fitted into the pocket 32, there is a procedure as shown in FIG. 7C: From the inner-diameter-side surface of the segment 27, the small-diameter end of the tapered roller 15 is inserted obliquely into the more open side of the large-diameter-side engagement piece 36 to make contact to the anti-dislocation projection 42; then, an impact is applied to elastically deform the anti-dislocation projection 42 thereby forcing the roller into place. The tapered roller 15 which is forcibly fitted into the pocket 32 becomes integral with the segment 27 and will not separate therefrom.

It should be noted here that in Embodiment 2, the posts 31 on the left and the right ends do not have the engagement claws 35a to facilitate removal from the molding at the time of injection molding.

Figure 8A:
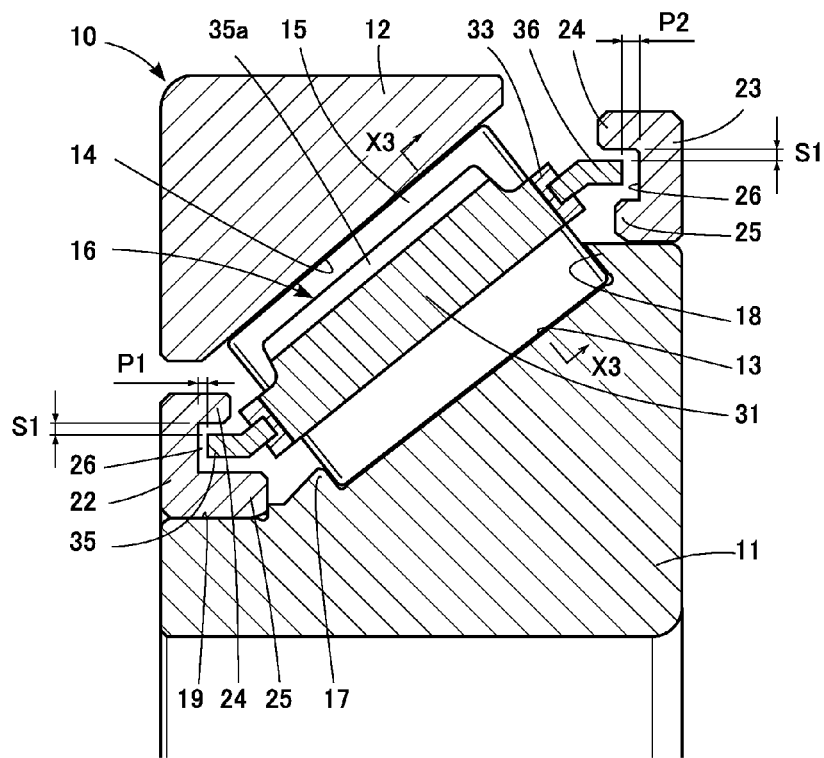
FIG. 8A is a partially omitted sectional view of the tapered roller bearing in Embodiment 2.
Figure 8B:
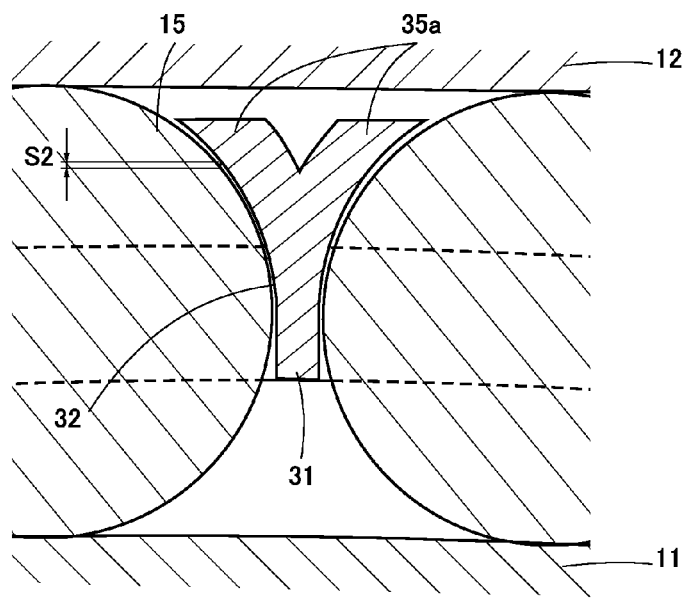
FIG. 8B is an enlarged sectional view taken in lines X3-X3 in FIG. 8A.

FIG. 8A shows a tapered roller bearing 10 which makes use of a split type retainer 16 obtained by assembling the segments 27 with each other. Although it is essentially the same as Embodiment 1 (see FIG. 1) in its basic structure, there are the following differences:

First, in the small-diameter-side engagement member 22, there is a radial gap S1 between the protrusion 24 in the engagement recess 26 and the small-diameter-side engagement piece 35 whereas in the large-diameter-side engagement members 23, there is a radial gap S1 between the protrusion 24 in the engagement recess 26 and the large-diameter-side engagement piece 36; and these gaps are both in the following relationship with a radial gap S2 (see FIG. 8B) between the tapered roller 15 in the pocket 32 and an engagement claw 35a in the segment 27: S1>S2.

This relationship prevents the small-diameter-side engagement piece 35 and the large-diameter-side engagement piece 36 in the segment 27 from interfering with respective inner-diameter surfaces of the protrusions 24 even if the segment 27 makes a radial movement with respect to the tapered rollers 15 within the range of gap S2.

Second, an axial gap P1 between the inner surface (surface on the inner ring track 13 side) of the small-diameter-side engagement member 22 and the small-diameter-side engagement piece 35 of the segment 27, and an axial gap AK of the pocket 32 with respect to the tapered roller 15; an axial gap P2 between the inner surface (surface on the inner ring track 13 side) of the large-diameter-side engagement member 23 and the large-diameter-side engagement piece 36 of the segment 27, and the axial gap AK of the pocket 32 with respect to the tapered roller 15, have the following relationship: P1>AK and P2>AK.

The relationship described above prevents interference with the engagement recess 26 on the small-diameter-side engagement members 22 or on the large-diameter-side engagement members 23 even if the segment 27 makes an axial movement within the range of gap AK.

The above described first relationship and the second relationship are also applicable to Embodiment 1.

REFERENCE SIGNS LIST 10 tapered roller bearing
11 inner ring
12 outer ring
13 inner ring track
14 outer ring track
15 tapered roller
16 split type retainer
17 small flange portion
18 large flange portion
19 small-diameter mounting portion
21 large-diameter mounting portion
22 small-diameter engagement member
23 large-diameter engagement member
24 protrusion
25 base
26 engagement recess
27 segment
28 small-diameter-side end fringe
29 large-diameter-side end fringe
31 post
32 pocket
33 segment main body
33a small-diameter-side wall
33b large-diameter-side wall
34 outer frame member
35 small-diameter-side engagement piece
35a engagement claw
36 large-diameter-side engagement piece
37 shorter side wall
38 engagement-member half
38a connection flange
39a right-threaded hole
39b left-threaded hole
40 connecting member
41a right-threaded shaft
41b left-threaded shaft
41c intermediate shaft portion
42 anti-dislocation projection

The invention claimed is:

1. A retainer segment for a tapered roller bearing, having a shape given by equally dividing a conical, cage-shaped retainer by planes of division each passing through a centerline of the retainer, a plurality of the segments being connected in an annular pattern to provide a split type retainer and each having a small-diameter-side end fringe constituting a small-diameter-side circumferential edge of the split type retainer and a large-diameter-side end fringe constituting a large-diameter-side circumferential edge of the split type retainer, a predetermined number of posts being provided between the small-diameter-side end fringe and the large-diameter-side end fringe while roller holding pockets being provided between the posts, the retainer segment comprising an axially outward protruding large-diameter-side engagement piece at least on the large-diameter-side end fringe out of the small-diameter-side end fringe and the large-diameter-side end fringe;

wherein the small-diameter-side end fringe is provided with an axially outward protruding small-diameter-side engagement piece; and wherein the retainer segment includes a segment main body and an outer frame member provided integrally around an outer circumference of the segment main body, the segment main body being formed with the pockets, the outer frame member being provided with the large-diameter-side engagement piece and the small-diameter-side engagement piece.

2. The retainer segment according to claim 1, wherein the large-diameter-side engagement piece and the small-diameter-side engagement piece protrude to respective outer circumferences of a large-diameter mounting portion and a small-diameter mounting portion which are provided on axially outer side of a large flange and a small flange of an inner ring of the bearing.

3. The retainer segment according to claim 1, wherein the segment main body is made of a synthetic resin while the outer frame member is made of a metal.

4. The retainer segment according to claim 1, wherein the segment main body and the outer frame member are made of a synthetic resin integrally with each other.

5. A retainer segment for a tapered roller bearing, having a shape given by equally dividing a conical, cage-shaped retainer by planes of division each passing through a centerline of the retainer, a plurality of the segments being connected in an annular pattern to provide a split type retainer and each having a small-diameter-side end fringe constituting a small-diameter-side circumferential edge of the split type retainer and a large-diameter-side end fringe constituting a large-diameter-side circumferential edge of the split type retainer, a predetermined number of posts being provided between the small-diameter-side end fringe and the large-diameter-side end fringe while roller holding pockets being provided between the posts, the retainer segment comprising an axially outward protruding large-diameter-side engagement piece at least on the large-diameter-side end fringe out of the small-diameter-side end fringe and the large-diameter-side end fringe;

wherein out of all the posts which provide the pockets, each of the post at the left end and the post at the right end has its inner side surface provided with an anti-dislocation projection protruding inward of the pocket, the anti-dislocation projection protruding to an extent to allow forcible fitting of the tapered roller into the pocket and not to allow the tapered roller to come off after the forcible fitting.

6. The retainer segment according to claim 5, wherein an amount of protrusion of the anti-dislocation projection is 2 percent through 8 percent of an average diameter of the tapered rollers.

7. The retainer segment according to claim 5, wherein the anti-dislocation projection is offset from a center of the pocket, at a place closer to the small-diameter-side end fringe.

8. A retainer segment for a tapered roller bearing, having a shape given by equally dividing a conical, cage-shaped retainer by planes of division each passing through a centerline of the retainer, a plurality of the segments being connected in an annular pattern to provide a split type retainer and each having a small-diameter-side end fringe constituting a small-diameter-side circumferential edge of the split type retainer and a large-diameter-side end fringe constituting a large-diameter-side circumferential edge of the split type retainer, a predetermined number of posts being provided between the small-diameter-side end fringe and the large-diameter-side end fringe while roller holding pockets being provided between the posts, the retainer segment comprising an axially outward protruding large-diameter-side engagement piece at least on the large-diameter-side end fringe out of the small-diameter-side end fringe and the large-diameter-side end fringe;

wherein the post has an engagement claw on a surface facing an outer-ring track, for a tapered roller in the pocket;

wherein a small-diameter mounting portion provided on an axially outer side of a small flange of an inner ring of the bearing and a large-diameter mounting portion provided on an axially outer side of a large flange of the bearing's inner ring are fitted with a small-diameter engagement member and a large-diameter engagement member respectively, both of the small-diameter engagement member and the large-diameter engagement member having their sections resembling an inverted letter L, providing an inward facing engagement recess; and wherein each of the small-diameter engagement member and the large-diameter engagement member is provided by a ring-shaped assembly of two engagement-member halves assembled into a ring shape using screws.

9. The tapered roller bearing according to claim 8, wherein the engagement-member halves are semicircular, and one of the semi-circular engagement-member halves has its two end portions each provided with a connection flange extending in an outer diameter direction and formed with a screw hole in a mating surface of the connection flange while the other of the engagement-member halves is symmetric with the first one, differing only in that a thread of the screw hole is a reverse thread, the two engagement-member halves being connected with each other to form the ring shape using connecting members, each having an intermediate shaft portion, with two ends formed with mutually reverse threads, the ends being threaded into their corresponding threaded holes to bring both of the engagement-member halves closer to each other thereby connecting the two into the ring-shaped assembly.

10. A retainer segment for a tapered roller bearing, having a shape given by equally dividing a conical, cage-shaped retainer by planes of division each passing through a centerline of the retainer, a plurality of the segments being connected in an annular pattern to provide a split type retainer and each having a small-diameter-side end fringe constituting a small-diameter-side circumferential edge of the split type retainer and a large-diameter-side end fringe constituting a large-diameter-side circumferential edge of the split type retainer, a predetermined number of posts being provided between the small-diameter-side end fringe and the large-diameter-side end fringe while roller holding pockets being provided between the posts, the retainer segment comprising an axially outward protruding large-diameter-side engagement piece at least on the large-diameter-side end fringe out of the small-diameter-side end fringe and the large-diameter-side end fringe;

wherein the small-diameter-side end fringe is provided with an axially outward protruding small-diameter-side engagement piece;

wherein the post has an engagement claw on a surface facing an outer-ring track, for a tapered roller in the pocket; and wherein a small-diameter mounting portion provided on an axially outer side of a small flange of an inner ring of the bearing and a large-diameter mounting portion provided on an axially outer side of a large flange of the bearing's inner ring are fitted with a small-diameter engagement member and a large-diameter engagement member respectively, both of the small-diameter engagement member and the large-diameter engagement member having their sections resembling an inverted letter L, providing an inward facing engagement recess; and wherein a radial gap between the engagement recess in the small diameter sidesmall-diameter engagement member and the small-diameter-side engagement piece, and a radial gap between the engagement recess in the large-diameter engagement member and the large-diameter-side engagement piece are both greater than a radial gap between a tapered roller in the pocket and the engagement claw.

11. A retainer segment for a tapered roller bearing, having a shape given by equally dividing a conical, cage-shaped retainer by planes of division each passing through a centerline of the retainer, a plurality of the segments being connected in an annular pattern to provide a split type retainer and each having a small-diameter-side end fringe constituting a small-diameter-side circumferential edge of the split type retainer and a large-diameter-side end fringe constituting a large-diameter-side circumferential edge of the split type retainer, a predetermined number of posts being provided between the small-diameter-side end fringe and the large-diameter-side end fringe while roller holding pockets being provided between the posts, the retainer segment comprising an axially outward protruding large-diameter-side engagement piece at least on the large-diameter-side end fringe out of the small-diameter-side end fringe and the large-diameter-side end fringe;

wherein the small-diameter-side end fringe is provided with an axially outward protruding small-diameter-side engagement piece; and wherein a small-diameter mounting portion provided on an axially outer side of a small flange of an inner ring of the bearing and a large-diameter mounting portion provided on an axially outer side of a large flange of the bearing's inner ring are fitted with a small-diameter engagement member and a large-diameter engagement member respectively, both of the small-diameter engagement member and the large-diameter engagement member having their sections resembling an inverted letter L, providing an inward facing engagement recess; and wherein an axial gap between the engagement recess in the small-diameter engagement member and the small-diameter-side engagement piece, and an axial gap between the engagement recess in the large-diameter engagement member and the large-diameter-side engagement piece are both greater than an axial gap of the pocket with respect to the tapered roller.

12. A method for mounting a tapered roller bearing into target equipment, the tapered roller bearing comprising a retainer segment having a shape given by equally dividing a conical, cage-shaped retainer by planes of division each passing through a centerline of the retainer, a plurality of the segments being connected in an annular pattern to provide a split type retainer and each having a small-diameter-side end fringe constituting a small-diameter-side circumferential edge of the split type retainer and a large-diameter-side end fringe constituting a large-diameter-side circumferential edge of the split type retainer, a predetermined number of posts being provided between the small-diameter-side end fringe and the large-diameter-side end fringe while roller holding pockets being provided between the posts, the retainer segment comprising an axially outward protruding large-diameter-side engagement piece at least on the large-diameter-side end fringe out of the small-diameter-side end fringe and the large-diameter-side end fringe, wherein a large-diameter mounting portion provided on an axially outer side of a large flange of an inner ring of the bearing is fitted with a large-diameter engagement member, the large-diameter engagement member having a section resembling an inverted letter L, providing an inward facing engagement recess;

said method comprising steps of: fitting and fixing the bearing's inner ring around a shaft; then fitting and fixing the large-diameter engagement member to the large-diameter mounting portion of the inner ring; then placing the retainer segments loaded with tapered rollers around an inner ring track while engaging the segments' large-diameter-side engagement pieces with the large-diameter mounting portion; and after completing this placement, fitting an outer ring of the bearing around the tapered rollers.

13. A method for mounting a tapered roller bearing into target equipment, the tapered roller bearing comprising a retainer segment having a shape given by equally dividing a conical, cage-shaped retainer by planes of division each passing through a centerline of the retainer, a plurality of the segments being connected in an annular pattern to provide a split type retainer and each having a small-diameter-side end fringe constituting a small-diameter-side circumferential edge of the split type retainer and a large-diameter-side end fringe constituting a large-diameter-side circumferential edge of the split type retainer, a predetermined number of posts being provided between the small-diameter-side end fringe and the large-diameter-side end fringe while roller holding pockets being provided between the posts, the retainer segment comprising an axially outward protruding large-diameter-side engagement piece at least on the large-diameter-side end fringe out of the small-diameter-side end fringe and the large-diameter-side end fringe;

wherein the small-diameter-side end fringe is provided with an axially outward protruding small-diameter-side engagement piece; and wherein a small-diameter mounting portion provided on an axially outer side of a small flange of an inner ring of the bearing and a large-diameter mounting portion provided on an axially outer side of a large flange of the bearing's inner ring are fitted with a small-diameter engagement member and a large-diameter engagement member respectively, both of the small-diameter engagement member and the large-diameter engagement member having their sections resembling an inverted letter L, providing an inward facing engagement recess;

said method comprising steps of: fitting and fixing the bearing's inner ring around a shaft; then fitting and fixing the large-diameter engagement member to the large-diameter mounting portion of the inner ring; then placing the retainer segments loaded with tapered rollers around an inner ring track while engaging the segments' large-diameter-side engagement pieces with the large-diameter mounting portion; and after completing this arrangement, fitting and fixing the small-diameter engagement member to the small-diameter mounting portion thereby engaging the small-diameter engagement member with the small-diameter-side engagement pieces; and thereafter fitting an outer ring of the bearing around the tapered rollers.

14. The method for mounting a tapered roller bearing according to claim 13, wherein after completing the assembly of the tapered roller bearing into the equipment, the small-diameter engagement member and the large-diameter engagement member are separated and removed from the inner ring.

* * * * *